(12) United States Patent
Misaki et al.

(10) Patent No.: US 11,301,901 B2
(45) Date of Patent: Apr. 12, 2022

(54) ADVERTISEMENT DELIVERY SYSTEM, INFORMATION PROCESSING DEVICE, AND ADVERTISEMENT DISTRIBUTION DEVICE

(71) Applicant: TOYOTA JIDOSHA KABUSHIKI KAISHA, Toyota (JP)

(72) Inventors: Masahiro Misaki, Nagoya (JP); Orie Mitsuhashi, Kasugai (JP); Masahiro Ueda, Nisshin (JP); Yoshitaka Atsumi, Toyota (JP); Naoto Sasagawa, Nishio (JP); Naoki Yamamuro, Nagoya (JP); Chiho Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/601,659

(22) Filed: Oct. 15, 2019

(65) Prior Publication Data
US 2020/0118169 A1 Apr. 16, 2020

(30) Foreign Application Priority Data

Oct. 12, 2018 (JP) .............................. JP2018-193803

(51) Int. Cl.
*G06Q 30/02* (2012.01)

(52) U.S. Cl.
CPC ..... *G06Q 30/0261* (2013.01); *G06Q 30/0266* (2013.01); *G06Q 30/0267* (2013.01); *G06Q 30/0269* (2013.01)

(58) Field of Classification Search
CPC ........... G06Q 30/0261; G06Q 30/0266; G06Q 30/0267; G06Q 30/0269
See application file for complete search history.

(56) References Cited

U.S. PATENT DOCUMENTS

| 2015/0271532 | A1  | 9/2015 | Igarashi |
| 2016/0042391 | A1  | 2/2016 | Yamamura |
| 2016/0063567 | A1* | 3/2016 | Srivastava ......... G06Q 30/0269 705/14.66 |
| 2017/0243253 | A1* | 8/2017 | DeBacco ............. G06Q 20/387 |
| 2018/0160282 | A1* | 6/2018 | van de Poll .......... H04W 4/029 |
| 2018/0225678 | A1* | 8/2018 | MacIlwaine ........... G06Q 30/02 |

FOREIGN PATENT DOCUMENTS

| JP | 2018-004878 A  | 1/2018  |
| WO | 2014/185018 A1 | 11/2014 |

* cited by examiner

*Primary Examiner* — Scott C Anderson
(74) *Attorney, Agent, or Firm* — Oliff PLC (57) ABSTRACT

It is an object of the present disclosure to provide more appropriate advertisement information for each of a plurality of users sharing a specific space. The advertisement delivery system provides advertisement information to each user existing in a specific space shared by a plurality of users having a specific purpose. In this advertisement delivery system, an information processing device generates advertisement information for each user based on an attribute of a specific space associated with a specific purpose and an attribute of each user associated with the specific purpose. The advertisement distribution device arranged in a specific space receives advertisement information for each user from the information processing device and transmits the received advertisement information to the user terminal associated with the user to be provided.

3 Claims, 7 Drawing Sheets

VEHICLE INFORMATION

| VEHICLE ID | DESTINATION INFORMATION |
|---|---|
| V001 | ... |

Fig. 5

USER INFORMATION

| USER ID | TRAVEL PURPOSE INFORMATION |
|---|---|
| M001 | ... |

Fig. 6

ADVERTISEMENT INFORMATION

| VEHICLE ID | USER ID | ADVERTISEMENT INFORMATION |
|---|---|---|
| V001 | M001 | ... |

FACILITY INFORMATION

| FACILITY ID | EVENT INFORMATION |
|---|---|
| P001 | ... |

Fig. 9

USER INFORMATION

| USER ID | FEATURED PERFORMER INFORMATION |
|---|---|
| M002 | ... |

Fig. 10

ADVERTISEMENT INFORMATION

| FACILITY ID | USER ID | ADVERTISEMENT INFORMATION |
|---|---|---|
| P001 | M002 | ... |

ADVERTISEMENT DELIVERY SYSTEM, INFORMATION PROCESSING DEVICE, AND ADVERTISEMENT DISTRIBUTION DEVICE

CROSS REFERENCE TO THE RELATED APPLICATION

This application claims the benefit of Japanese Patent Application No. 2018-193803, filed on Oct. 12, 2018, which is hereby incorporated by reference herein in its entirety.

BACKGROUND

Technical Field

The present disclosure relates to an advertisement delivery system, an information processing device, and an advertisement distribution device for providing advertisement information to a user.

Description of the Related Art

Patent Document 1 discloses a technique related to an information processing device having advertisement providing means for providing advertisement information to a user. In the information processing device according to Patent Document 1, advertisement information of a point included in map information used for movement guidance for a user is acquired by advertisement information obtaining means. Further, from the advertisement information acquired by the advertisement information obtaining means, the advertisement information to be provided to the user is extracted by the advertisement providing means based on the classification of the user, the current date and time, and the current position of the user.

CITATION LIST

Patent Document

[Patent document 1] Japanese Patent Laid-Open No. 2018-4878

SUMMARY

It is an object of the present disclosure to provide more appropriate advertisement information for each of a plurality of users sharing a specific space.

An advertisement delivery system according to the first embodiment of the present disclosure may be an advertisement delivery system configured to provide advertisement information to each user existing in a specific space shared by a plurality of users having a specific purpose, the advertisement delivery system comprising:

an information processing device configured to generate advertisement information for each user based on an attribute of the specific space associated with the specific purpose and an attribute of each user associated with the specific purpose; and an advertisement distribution device arranged in the specific space, and configured to receive the advertisement information for each user from the information processing device and transmit the received advertisement information to a user terminal associated with the user to be provided.

An information processing device according to the second embodiment of the present disclosure may be an information processing device adapted to be used with the advertisement delivery system according to the first embodiment of the present disclosure, the information processing device including a first controller configured to execute:

generating advertisement information for each user based on the attribute of the specific space associated with the specific purpose and the attribute of each user associated with the specific purpose; and transmitting the advertisement information for each user to the advertisement distribution device.

The advertisement distribution device according to the third embodiment of the present disclosure may be an advertisement distribution device adapted to be used with the advertisement delivery system according to the first embodiment of the present disclosure, the advertisement distribution device including a second controller configured to execute:

receiving the advertisement information for each user from the information processing device, transmitting the received advertisement information to the user terminal associated with the user to be provided.

According to the present disclosure, a more appropriate advertisement can be provided to each of a plurality of users sharing a specific space.

DESCRIPTION OF THE EMBODIMENTS

The advertisement delivery system according to the first embodiment of the present disclosure may provides advertisement information to each user existing in a specific space shared by a plurality of users having a specific purpose. Here, as "specific space", there can be exemplified a space in a vehicle shared by a plurality of users aiming to move to a specific place, a space in a facility shared by a plurality of users aiming to participate in a specific event, or the like.

An advertisement delivery system according to the present disclosure may include an information processing device and an advertisement distribution device. The information processing device generates advertisement information for each user based on an attribute of a specific space associated with a specific purpose common to a plurality of users and an attribute of each user associated with the specific purpose. That is, the information processing device may generate advertisement information corresponding to each of a plurality of users sharing the specific space. Here, for example, when the "specific space" is a space in a vehicle shared by a plurality of users who aim to move to a specific place, the specific place, which is the destination of the plurality of users (i.e., the destination of the vehicle), may be the "attribute of the specific space". In addition, when the "specific space" is a space in a facility shared by a plurality of users aiming to participate in a specific event, the specific event in which the plurality of users aim to participate (i.e., the event held in the facility) may be the "attribute of the specific space". In addition, the individual purpose, preference, or the like of each of the plurality of users may be "attribute of each user".

As described above, the information processing device may generate advertisement information for each user existing in a specific space. Then, the information processing device may transmit the generated advertisement information to an advertisement distribution device arranged in a specific space. Then, the advertisement distribution device may transmit the advertisement information received from the information processing device to the user terminal associated with the user to be provided with the advertisement information among the plurality of users existing in the specific space. As a result, the advertisement information generated for each user in the information processing device may be distributed to the user to be provided via the advertisement distribution device. The user terminal may be a terminal owned by each user or may be a terminal installed so as to be usable for each user in a specific space.

Here, in cases where advertisement information is going to be provided to a plurality of users sharing a specific space, conventionally, there is a tendency that common advertisement information corresponding to an attribute of the specific space is simply provided uniformly to the plurality of users. However, in such a case, there is a fear that the attribute of each user may not be sufficiently reflected on the advertisement information provided to each user. On the other hand, in cases where advertisement information corresponding to an attribute of each user is simply provided to a plurality of users sharing a specific space, there is a fear that advertisement information having a low relevance to the attribute of the specific space is provided to each user existing in the specific space.

In contrast, according to the advertisement delivery system of the first embodiment of the present disclosure, it is possible to provide advertisement information that is highly relevant to the attribute of the specific space and that is sufficiently reflect the attribute of each user, to each of a plurality of users sharing the specific space. In other words, it is possible to provide advertisement information that is higher concern for each user to each user.

As described above, according to the advertisement delivery system of the first embodiment of the present disclosure, advertisement information for each user generated by the information processing device may be distributed to each user via the advertisement distribution device arranged in a specific space. As a result, advertisement information for each user can be provided to each user existing in a specific space at an appropriate timing.

Hereinafter, specific embodiments of the present disclosure will be described with reference to drawings. Dimensions, materials, shapes, relative positions and the like of structural components described in the present embodiments are not intended to limit the technical scope of the disclosure unless specified otherwise.

First Embodiment

Here, an embodiment in which the present disclosure is applied to an advertisement delivery system for providing advertisement information to a plurality of users on a tourist bus will be described. In this case, a space in a vehicle (tourist bus) shared by a plurality of users who aim to move to a specific destination corresponds to a "specific space" according to the present disclosure.

(Outline of System)

Figure 1:
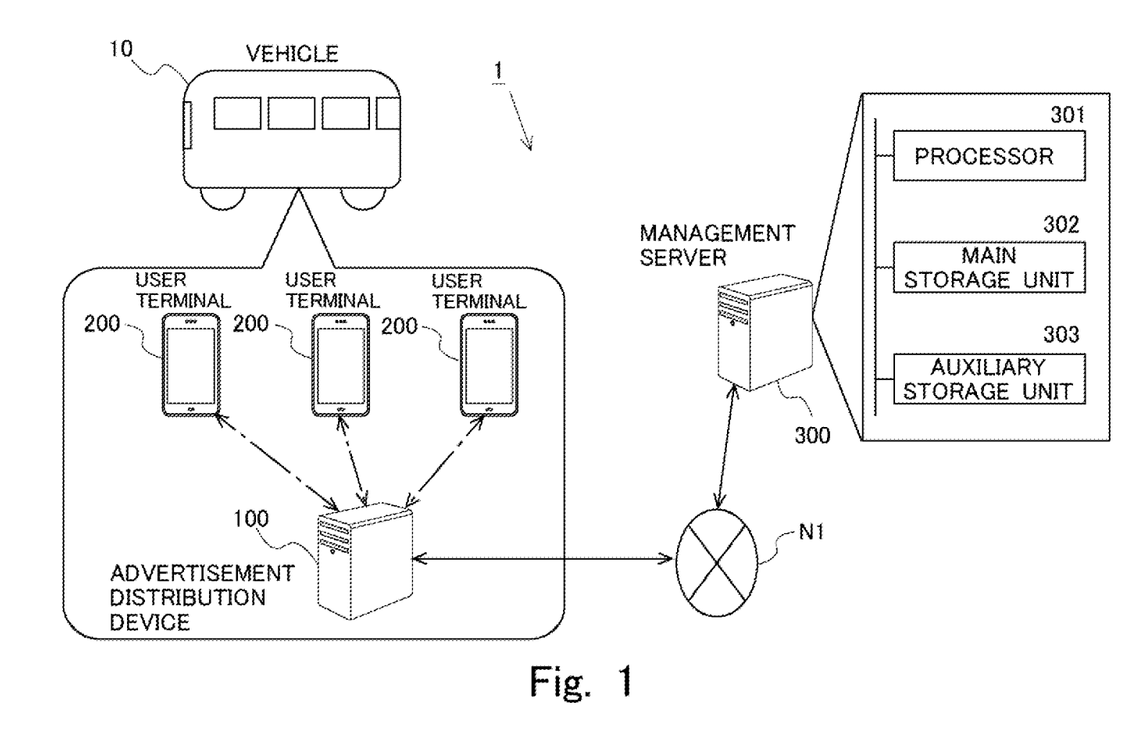
FIG. 1 is a diagram illustrating a schematic configuration of an advertisement delivery system according to a First embodiment.

FIG. 1 is a diagram showing a schematic configuration of an advertisement delivery system according to the present embodiment. A vehicle 10 in FIG. 1 is a tourist bus on which a plurality of users are riding. The advertisement delivery system 1 includes a user terminal 200 owned by each of a plurality of users riding on the vehicle 10, an advertisement distribution device 100 mounted on the vehicle 10, and a management server 300.

The user terminal 200 includes a computer including a processor, a main storage unit, and an auxiliary storage unit. As the user terminal 200, a smartphone, a tablet computer, a mobile computer, a wearable computer, a wireless storage, a mobile phone, a hand-held terminal or the like may be cited. The user terminal 200 does not necessarily have to be a terminal owned by the user, and may be, for example, a terminal installed for each seat in the vehicle 10 for each user.

In the vehicle 10, each user terminal 200 and the advertisement distribution device 100 are connected to each other by short distance wireless communication. The advertisement distribution device 100 has a function of distributing advertisement information generated for each user as described later to a user to be provided with the advertisement information among a plurality of users riding on the vehicle 10. Specifically, the advertisement distribution device 100 receives the advertisement information generated by the management server 300 and transmutes the received advertisement information to the user terminal 200 of the user to be provided. The advertisement distribution device 100 may be configured to include a computer having a processor, a main storage unit, and an auxiliary storage unit, or may be configured to include an instrument having a function as a gateway.

In the advertisement delivery system 1, the advertisement distribution device 100 and the management server 300 are connected to each other via a network N1. As the network N1, for example, a WAN (Wide Area Network) which is a world-wide public communication network such as the Internet, or a telephone communication network such as a mobile telephone may be adopted.

The management server 300 is a server device for managing various advertisement information. The management server 300 includes a general computer. The computer constituting the management server 300 includes a processor 301 such as a CPU or a DSP, a main storage unit 302 such as a read-only memory (ROM) or a random access memory (RAM), and an auxiliary storage unit 303 such as a EPROM, hard disk drives (HDDs), or removable media. Here, the removable medium is a flash memory such as a USB memory or an SD card, or a disk recording medium such as a CD-ROM, a DVD disk or a Blu-ray disc.

In the management server 300, the auxiliary storage unit 303 stores an operating system (OS), various programs, various information tables, and the like. Furthermore, at the management server 300, various functional as described later may be implemented by the processor 301 loading the programs stored in the auxiliary storage unit 303 into the main storage unit 302 and executing the programs. However, a part or all of the functional of the management server 300 may be implemented by a hardware circuit such as an ASIC or an FPGA. Additionally, the management server 300 does not necessarily have to be achieved by a single physical configuration and may be formed by a plurality of computers operating in coordination.

The management server 300 generates advertisement information to be provided to each user riding on the vehicle 10. Then, the generated advertisement information is transmitted to the advertisement distribution device 100 via the network N1.

(System Configuration)

Figure 2:
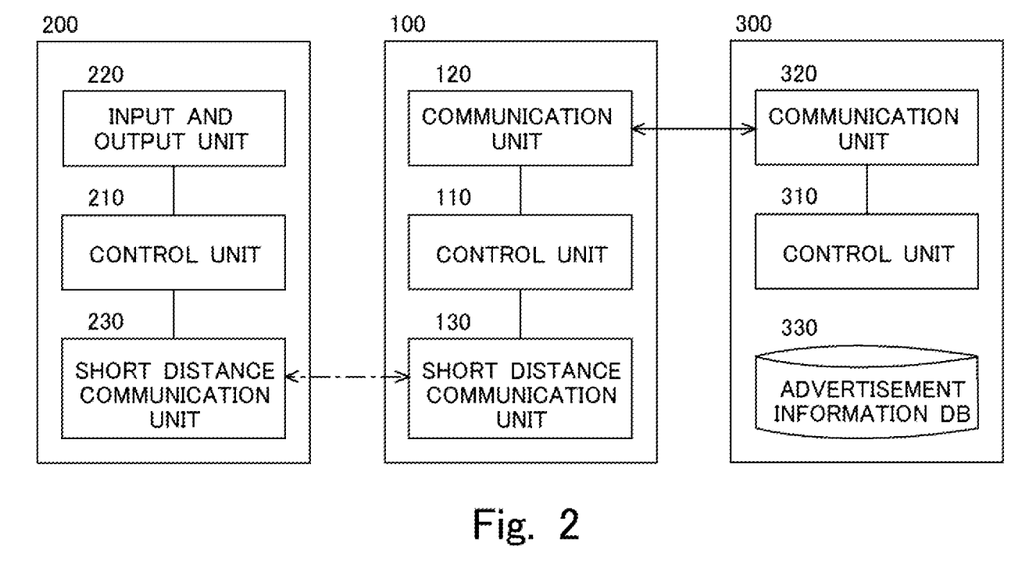
FIG. 2 is a block diagram schematically showing an example of the functional configuration of each of the user terminal, the advertisement distribution device, and the management server that constitute the advertisement delivery system.

Next, the functional configurations of the user terminal 200, the advertisement distribution device 100, and the management server 300 constituting the advertisement delivery system 1 according to the present embodiment will be described with reference to FIG. 2. FIG. 2 is a block diagram schematically showing an example of the functional configuration of each of the user terminal 200, the advertisement distribution device 100, and the management server 300 that constitute the advertisement delivery system 1 according to the present embodiment.

(User Terminal)

The user terminal 200 includes a control unit 210, an input and output unit 220, and a short distance communication unit 230. The control unit includes a function of performing arithmetic processing for controlling the user terminal 200. The control unit 210 may be implemented by the processor. Furthermore, various processes by the control unit 210 may be implemented by the processor loading programs stored in the auxiliary storage unit into the main storage unit and executing the programs.

The input and output unit 220 has a function of accepting an input operation performed by a user and a function of presenting information to the user. Specifically, the input and output unit 220 includes a touch panel display. In the user terminal 200, the control unit 210 operates a predetermined application, so that the user can perform an input operation on the touch panel display of the input and output unit 220. The user can input user information by performing an input operation on the touch panel display of the input and output unit 220.

Figure 3:
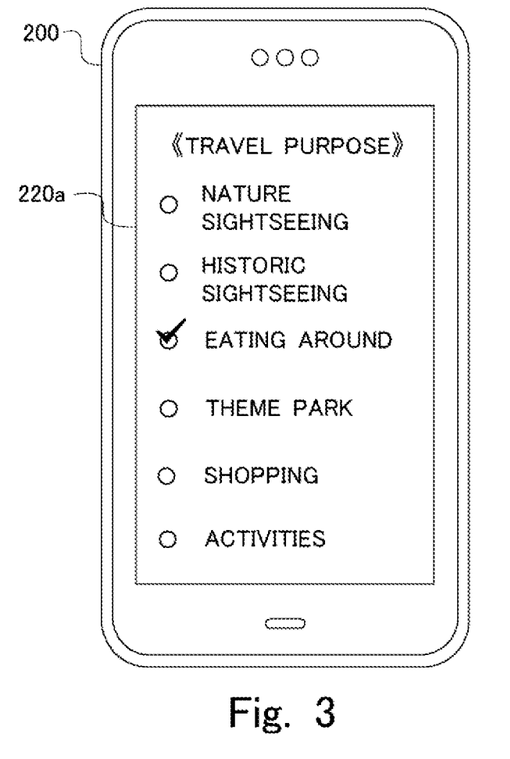
FIG. 3 is a diagram showing an example of an operation screen displayed on the touch panel display of the input and output unit in the user terminal.

FIG. 3 is a diagram showing an example of an operation screen displayed on the touch panel display 220a of the input and output unit 220 when a predetermined application is operated in the user terminal 200. In the operation screen shown in FIG. 3, the user can input the travel purpose (purpose of travel) (in FIG. 3, the user selects "EATING AROUND" as the purpose of travel). That is, here, the travel purpose of the user who possesses the user terminal 200 is input to the input and output unit 220 as user information about the user. In the operation screen shown in FIG. 3, when a plurality of travel purposes of the user are selected, the plurality of travel purposes may be input as user information.

The touch panel display 220a of the input and output unit 220 displays advertisement information for each user who possesses each user terminal 200. The control unit 210 performs a process of displaying the advertisement information on the touch panel display 220a of the input and output unit 220.

The short distance communication unit 230 communicates with the advertisement distribution device 100 using a predetermined wireless communication standard. Examples of the communication standard that can be used for communication by the short distance communication unit 230 include Bluetooth (registered trademark) LowEnergy standard, WiFi (registered trademark), or the like. The control unit 210 performs a process of receiving advertisement information from the advertisement distribution device 100 via the short distance communication unit 230. In addition, the control unit 210 performs processing for transmitting user information input by the user to the input and output unit 220 to the advertisement distribution device 100 via the short distance communication unit 230, as described later.

(Advertise Distribution Device)

The advertisement distribution device 100 includes a control unit 110, a communication unit 120, and a short distance communication unit 130. The control unit 110 includes a function of performing arithmetic processing for controlling the advertisement distribution device 100. The control unit 110 can be realized by a processor, similarly to the control unit 210 of the user terminal 200.

The short distance communication unit 130 is a device that communicates with the user terminal 200 according to the same communication standard as the short distance communication unit 230 of the user terminal 200. The communication unit 120 is a communication device for connecting the advertisement distribution device 100 to the network N1. The communication unit 120 can communicate with other devices including the management server 300 via the network N1 using mobile communication services such as 3G (3rd Generation) or LTE (Long Term Evolution), for example.

The control unit 110 performs a process of receiving the user information transmitted from the user terminal 200 via the short distance communication unit 230. Further, the control unit 110 performs a process of transmitting the user information received from the user terminal 200 to the management server 300 via the communication unit 120. In addition, the control unit 110 performs a process of transmitting vehicle information about the vehicle 10 on which the advertisement distribution device 100 is mounted to the management server 300 via the communication unit 120, as described later. In addition, the control unit 110 performs a process of receiving the advertisement information transmitted from the management server 300 via the communication unit 120. Further, the control unit 110 performs a process of transmitting the advertisement information received from the management server 300 to the user terminal 200 of the user to be provided with the advertisement information via the short distance communication unit 130.

(Management Server)

The management server 300 includes a control unit 310, a communication unit 320, and an advertisement information database 330. The control unit 310 includes a function of performing arithmetic processing for controlling the management server 300. The control unit 310 may be implemented by the processor 301. Furthermore, various processes by the control unit 310 may be implemented by the processor loading programs stored in the auxiliary storage unit into the main storage unit, and executing the programs. For example, the control unit 110 performs a process of generating advertisement information for each user by using vehicle information received from the advertisement distribution device 100 and user information about each user (hereinafter, sometimes referred to as "advertisement information generation process").

The communication unit 320 is a communication device for connecting the management server 300 to the network N1. For example, the communication unit 320 includes a LAN (local area network) interface board, or a wireless communication circuit for wireless communication. The control unit 310 performs a process of receiving the user information transmitted from the user terminal 200 and the vehicle information via the communication unit 320. Further, the control unit 310 performs a process of transmitting the advertisement information generated by the advertisement information generation process to the advertisement distribution device 100 via the communication unit 320.

In addition, in the administration server 300, the advertisement information DB 330 is constructed in the auxiliary storage unit 303. The advertisement information DB 330 stores various kinds of advertisement information including advertisement information to be provided to users riding on the vehicle 10. In the advertisement information generation process, the control unit 310 extracts advertisement information for each user from the advertisement information stored in the advertisement information DB 330.

(System Operation)

Figure 4:
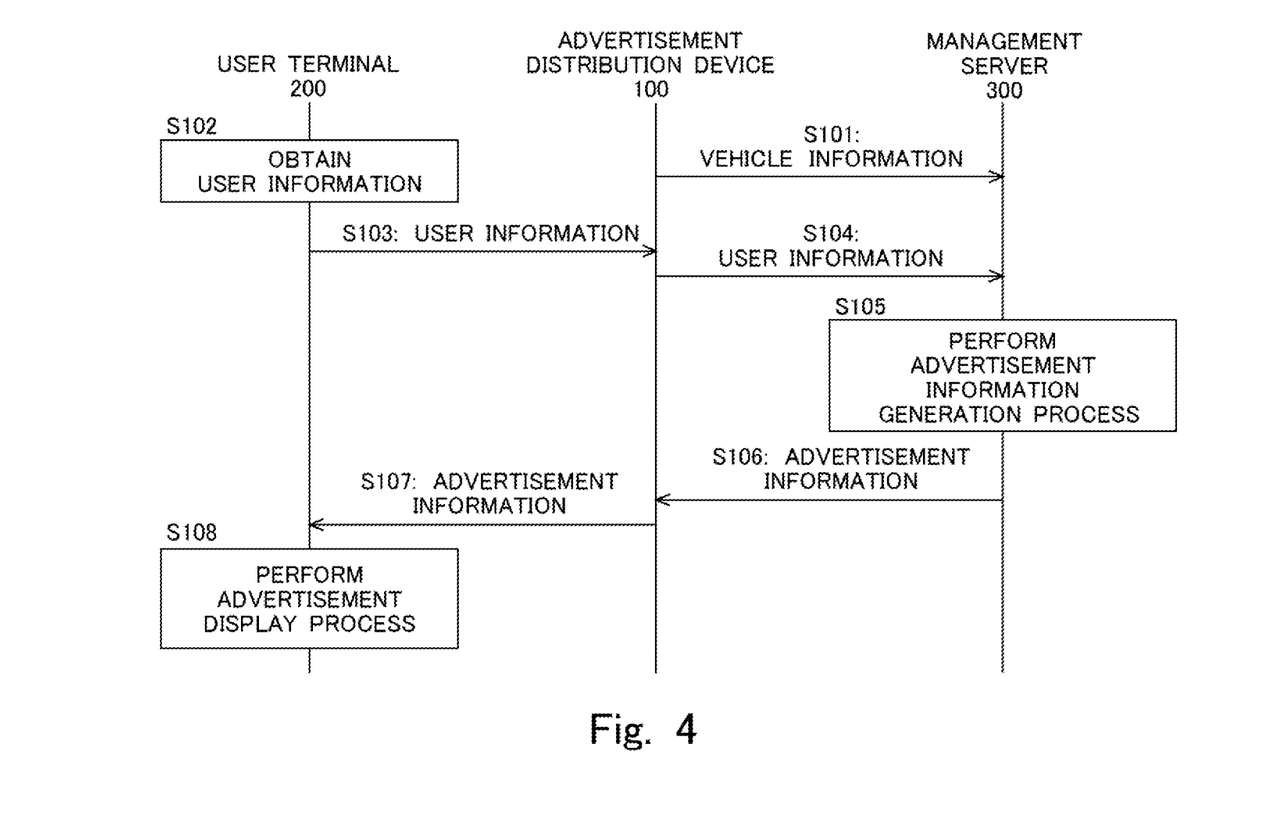
FIG. 4 is a sequence diagram showing a flow of processing and data performed when advertisement information is delivered to each user in the advertisement delivery system.
Figure 5:
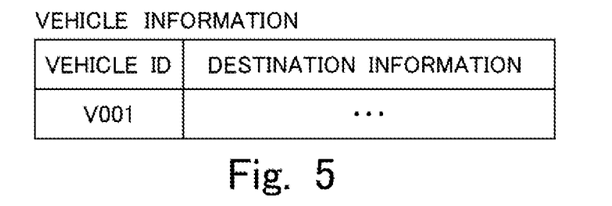
FIG. 5 shows an example of a table structure of vehicle information.
Figure 6:
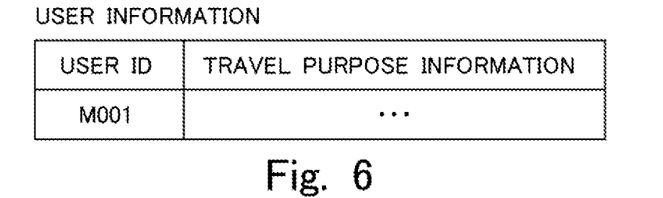
FIG. 6 shows an example of a table structure of user information.
Figure 7:
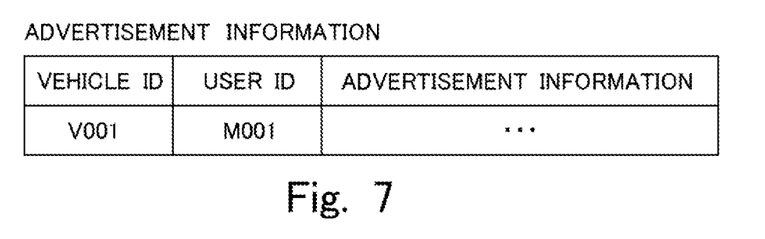
FIG. 7 shows an example of a table structure of advertisement information.

Next, an operation performed to deliver the advertisement information to each user in the advertisement delivery system 1 according to the present embodiment will be described with reference to FIGS. 4 to 7. FIG. 4 is a sequence diagram showing a flow of processing and data performed at the time of delivering advertisement information to each user in the advertisement delivery system 1. FIG. 5 is a diagram showing an example of a table configuration of vehicle information transmitted from the advertisement distribution device 100 to the management server 300. FIG. 6 is a diagram showing an example of a table configuration of user information transmitted from the user terminal 200 to the advertisement distribution device 100. FIG. 7 is a diagram showing an example of a table configuration of advertisement information transmitted from the management server 300 to the advertisement distribution device 100.

In the advertisement delivery system 1, the vehicle information as shown in FIG. 5 is transmitted from the advertisement distribution device 100 to the management server 300 (S101). As shown in FIG. 5, the vehicle information table has a vehicle ID field and a destination information field. In the vehicle ID field, a vehicle ID, which is identification information for specifying the vehicle 10 on which the advertisement distribution device 100 is mounted, is input. In the destination information field, the destination of the vehicle 10 (i.e., the destinations of a plurality of users riding on the vehicle 10) is input. Here, in the present embodiment, the destination of the vehicle 10 input to the destination information field of the vehicle information table corresponds to the "attribute of a specific space" according to the present disclosure. The destination information on the destination of the vehicle 10 is input in advance to the advertisement distribution device 100.

As described above, in the present embodiment, the travel purpose of each user is input as user information in the user terminal 200. As a result, the user terminal 200 acquires user data (S102). Then, the acquired user information is transmitted from the user terminal 200 to the advertisement distribution device 100 (S103). As shown in FIG. 6, the table of user information transmitted from the user terminal 200 to the advertisement distribution device 100 includes a user ID field and a travel purpose information field. In the user ID field, a user ID, which is identification information for specifying a user who possesses the user terminal 200, is input. In the travel purpose information field, the travel purpose of the user input by the user is input. Here, in the present embodiment, the travel purpose of each user input in the travel purpose information field of the user information table corresponds to the "attribute of each user" according to the present disclosure. The user information for each user is transmitted from each user terminal 200 to the advertisement distribution device 100.

Then, the advertisement distribution device 100 transmits the user information received from the user terminal 200 to the management server 300 (S104). At this time, to the user information transmitted from the advertisement distribution device 100 to the management server 300, the vehicle ID of the vehicle 10 on which the user of the user terminal 200 is riding (the vehicle ID input in the vehicle ID field of the vehicle information table shown in FIG. 5) is added. That is, the user information about each user is transmitted from the advertisement distribution device 100 to the management server 300 in a state associated with the vehicle 10. At this time, the advertisement distribution device 100 may collect the user information of each of the plurality of users riding on the vehicle 10 and add the vehicle ID of the vehicle 10 to the collected user information of the plurality of users, and then collectively transmit the user information of the plurality of users to the management server 300.

In the management server 300, the advertisement information generation process is performed by using the vehicle information and the user information received from the advertisement distribution device 100 (S105). As described above, the advertisement information generation process is processing for generating advertisement information for each user riding on the vehicle 10 (advertisement information corresponding to each of a plurality of users). Specifically, in the advertisement information generation process, advertisement information for each user is generated individually based on the destination of the vehicle 10 included in the vehicle information and the travel purpose of each user included in the user information. At this time, in the advertisement information generation process, the advertisement information for each user is extracted from various advertisement information stored in the advertisement information DB 330. That is, the advertisement information generation process according to the present embodiment is, in other words, process for combining each user riding on the vehicle 10 and the advertisement information for each user extracted from various advertisement information stored in the advertisement information DB 330.

For example, when "EATING AROUND" is entered in the travel purpose information field of the user information, in the advertisement information generating process, advertisement information relating to a restaurant existing at the destination (or in the vicinity of the destination) of the vehicle 10 is extracted as advertisement information for the user corresponding to the user information from among various advertisement information stored in the advertisement information DB 330. Further, for example, when "HISTORIC SIGHSEEING" is entered in the travel purpose information field of the user information, in the advertisement information generating process, advertisement information relating to the historic sightseeing spot existing at the destination (or in the vicinity of the destination) of the vehicle 10 is extracted as advertisement information for the user corresponding to the user information from among various advertisement information stored in the advertisement information DB 330.

When the advertisement information is generated by the advertisement information generation process, the advertisement information is transmitted from the management server 300 to the advertisement distribution device 100 (S106). As shown in FIG. 7, the table of advertisement information transmitted from the management server 300 to the advertisement distribution device 100 includes a vehicle ID field, a user ID field, and an advertisement information field. In the vehicle ID field, the vehicle ID of the vehicle 10, that is, the vehicle on which the advertisement distribution device 100 to which advertisement information is to be transmitted is mounted, is input. The advertisement information is transmitted to the advertisement distribution device 100 mounted on the vehicle corresponding to the vehicle ID input in the vehicle ID field. In the user ID field, the user ID of the user to be provided with the advertisement information (the user who is the object of the advertisement information) is input. In the advertisement information field, the advertisement information generated for the user corresponding to the user ID input in the user ID field is input. At this time, the management server 300 may collectively transmit advertisement information generated for each user riding on the vehicle 10 to the advertisement distribution device 100. However, even in this case, each piece of advertisement information is transmitted to the advertisement distribution device 100 in a state associated with the user ID of the user to be provided with each piece of advertisement information.

Then, the advertisement distributing device 100 transmits the advertisement information received from the managing server 300 to the user terminal 200 of the user corresponding to the user ID entered in the user ID field (S107). As a result, the advertisement information generated for each user by the advertisement information generation process in the management server 300 is distributed to the user to be provided via the advertisement distribution device 100.

Upon receiving the advertisement information from the advertisement distribution device 100, the user terminal 200 performs an advertisement display process (S108). The advertisement display process is a process of displaying the received advertisement information on the touch panel display 220*a* of the input and output unit 220.

According to the advertisement delivery system 1 described above, it is possible to provide advertisement information that is highly relevant to the destination of the vehicle 10 and that corresponds to the travel purpose of each user, to each of a plurality of users riding on the vehicle 10. That is, it is possible to provide advertisement information that is higher concern for each user riding on the vehicle 10 to each user.

In the advertisement delivery system 1, the advertisement information generated by advertisement information generation process in the management server 300 is distributed to each user riding on the vehicle 10 via the advertisement distribution device 100 mounted on the vehicle 10. As a result, the advertisement information for each user riding on the vehicle 10 can be provided to each user who is moving toward the destination by the vehicle 10. Here, while each user is traveling toward a destination by the vehicle 10, each user's interest in the destination and his or her travel purpose is very high. Therefore, according to the advertisement delivery system 1 described above, the advertisement information for each user can be provided to each user riding on the vehicle 10 at an appropriate timing, that is, at a timing at which the advertisement effect is high.

Second Embodiment

Next, an embodiment in which the present disclosure is applied to an advertisement delivery system for providing advertisement information to a plurality of users participating in a specific event will be described. In this case, a space in a facility (event venue) in which a specific event is held and shared by a plurality of users aiming to participate in the specific event corresponds to a "specific space" according to the present disclosure.

(Outline of System)

Figure 8:
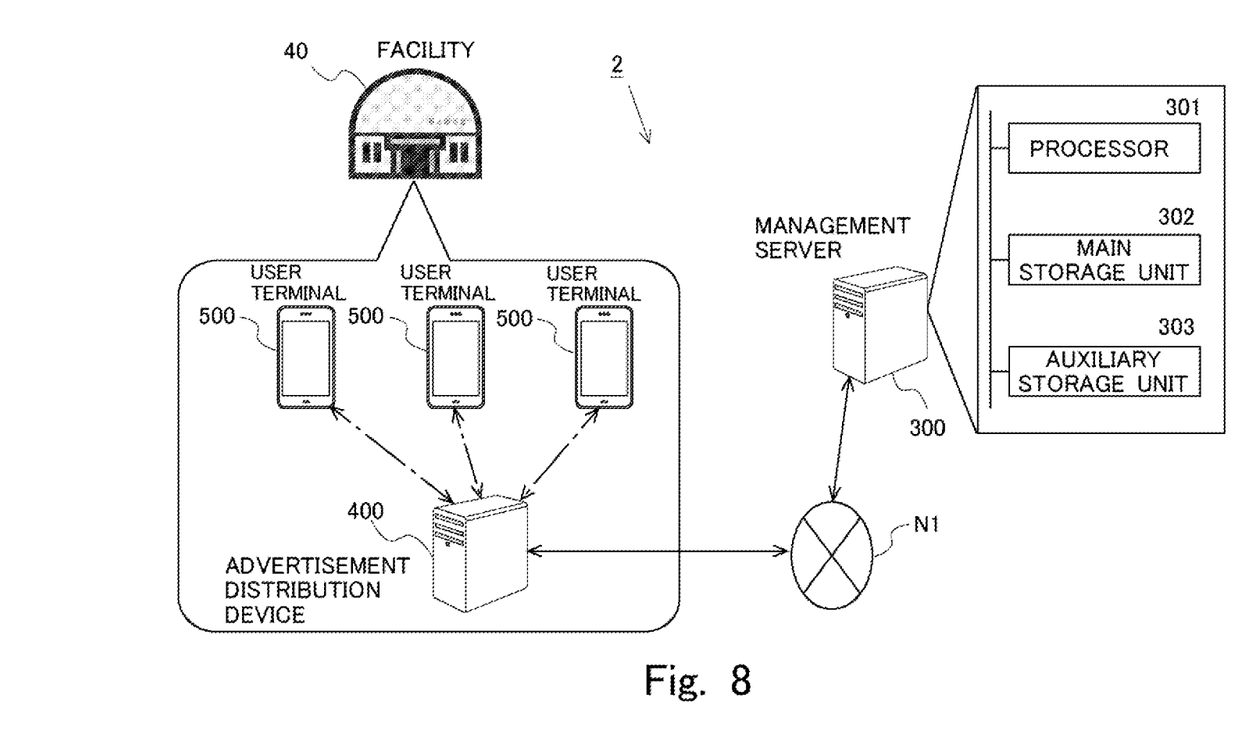
FIG. 8 is a diagram illustrating a schematic configuration of an advertisement delivery system according to a Second embodiment.

FIG. 8 is a diagram showing a schematic configuration of an advertisement delivery system according to the present embodiment. The facility 40 in FIG. 8 is a facility where a specific event is held. The advertisement delivery system 2 includes a user terminal 500 owned by each of a plurality of users participating in an event held in the facility 40, an advertisement distribution device 400 installed in the facility 40, and a management server 300. The functional configurations of the user terminal 500 and the advertisement distribution device 400 constituting the advertisement delivery system 2 according to the present embodiment are the same as those of the user terminal 200 and the advertisement distribution device 100 constituting the advertisement delivery system 1 according to the first embodiment, respectively. The management server 300 is a server device similar to the management server 300 constituting the advertisement delivery system 1 according to the first embodiment.

(System Operation)

Here, an operation performed to deliver the advertisement information to each user in the advertisement delivery system 2 according to the present embodiment will be described. Here, it is assumed that a plurality of performers appear at the specific event held in the facility 40.

Figure 9:
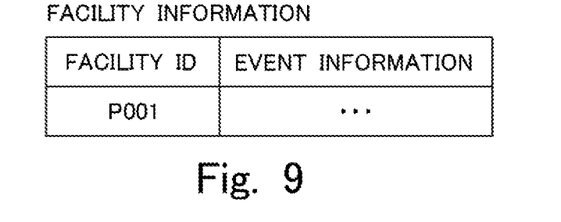
FIG. 9 is a diagram showing an example of a table configuration of facility information.

In the advertisement delivery system 2, facility information as shown in FIG. 9 is transmitted from the advertisement distribution device 400 to the management server 300. FIG. 9 is a diagram showing an example of a table configuration of facility information transmitted from the advertisement distribution device 400 to the management server 300. As shown in FIG. 9, the facility information table transmitted from the advertisement distribution device 400 to the management server 300 has a facility ID field and an event information field. In the facility ID field, a facility ID, which is identification information for specifying the facility 40 in which the advertisement distribution device 400 is installed, is input. In the event information field, the specific event held in the facility 40, i.e., the event in which a plurality of users aim to participate, is input. Here, in the present embodiment, the specific event input to the event information field of the facility information table corresponds to the "attribute of the specific space" according to the present disclosure. The event information about the specific event held in the facility 40 is input in advance to the advertisement distribution device 400.

Figure 10:
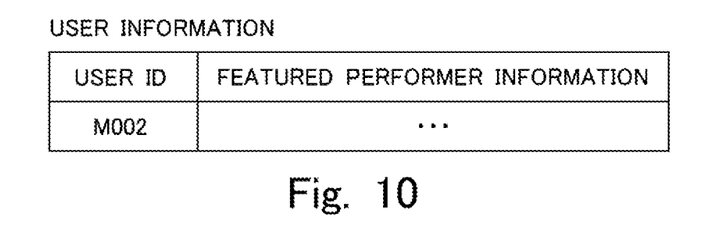
FIG. 10 is a diagram showing an example of a table configuration of user information.

In addition, in the present embodiment, in the user terminal 500, among a plurality of performers in a specific event held in the facility 40, a performer to which each user is particularly interested (hereinafter, sometimes referred to as "featured performer") is input as user information by each user. The user information input to the user terminal 500 is transmitted from the user terminal 500 to the advertisement distribution device 400. FIG. 10 is a diagram showing an example of a table configuration of user information transmitted from the user terminal 500 to the advertisement distribution device 400. As shown in FIG. 10, the table of user information transmitted from the user terminal 500 to the advertisement distribution device 100 has a user ID field and an featured performer information field. In the user ID field, a user ID, which is identification information for specifying a user who possesses the user terminal 500, is input. In the featured performer information field, the featured performer of the user input by the user to the user terminal 500 is input. Here, in the present embodiment, the featured performer of each user input in the featured performer information field of the user information table corresponds to the "attribute of each user" according to the present disclosure. The user information for each user is transmitted from each user terminal 500 to the advertisement distribution device 400.

Then, the advertisement distribution device 400 transmits the user information received from the user terminal 500 to the management server 300. At this time, to the user information transmitted from the advertisement distribution device 400 to the management server 300, the facility ID of the facility 40 in which the specific event in which the user possessing the user terminal 500 participates is held (the facility ID input in the facility ID field of the facility information table shown in FIG. 9) is added. That is, the user information about each user is transmitted from the advertisement distribution device 400 to the management server 300 in a state associated with the facility 40. At this time, the advertisement distribution device 400 may collect user information about each of a plurality of users participating in the specific event in the facility 40, and add the facility ID of the facility 40 to the collected user information for the plurality of users, and then collectively transmit the user information for the plurality of users to the management server 300.

The management server 300 performs the advertisement information generation process by using the facility information and the user information received from the advertisement distribution device 400. The advertisement information generation process here is process for generating advertisement information for each user participating in a specific event in the facility 40. Specifically, in the advertisement information generation process, advertisement information for each user is individually generated based on the specific event included in the facility information and the featured performer of each user included in the user information. At this time, in the advertisement information generation process, the advertisement information for each user is extracted from various advertisement information stored in the advertisement information DB 330. That is, the advertisement information generation process according to the present embodiment is, in other words, process for combining each user participating in a particular event in the facility 40 and advertisement information for each user extracted from various advertisement information stored in the advertisement information DB 330.

For example, when "performer A" is entered in the featured performer information field of the user information, in the advertisement information generation process, advertisement information related to the performer A about a particular event held in the facility 40 is extracted as advertisement information for the user corresponding to the user information from various advertisement information stored in the advertisement information DB 330.

Figure 11:
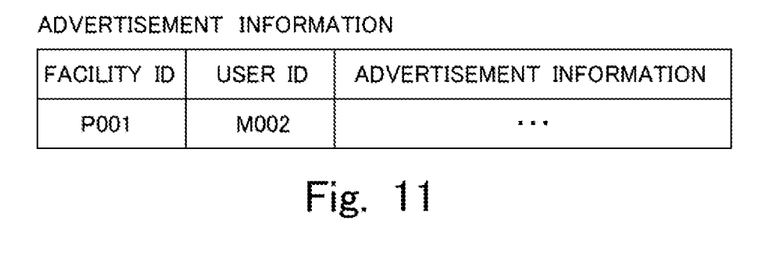
FIG. 11 is a diagram showing an example of a table configuration of advertisement information.

When the advertisement information is generated by the advertisement information generation process, the advertisement information is transmitted from the management server 300 to the advertisement distribution device 400. FIG. 11 is a diagram showing an example of a table configuration of advertisement information transmitted from the management server 300 to the advertisement distribution device 400. As shown in FIG. 11, the table of advertisement information transmitted from the management server 300 to the advertisement distribution device 400 has a facility ID field, a user ID field, and an advertisement information field. In the facility ID field, the facility ID of the facility 40, that is, the facility in which the advertisement distribution device 400 to which advertisement information is to be transmitted is installed, is input. The advertisement information is transmitted to the advertisement distribution device 400 installed in the facility corresponding to the facility ID input in the facility ID field. Similarly to the advertisement information according to the first embodiment shown in FIG. 7, the user ID of the user to be provided with the advertisement information is input to the user ID field. In the advertisement information field, advertisement information generated for the user corresponding to the user ID input in the user ID field is input. At this time, the management server 300 may collectively transmit advertisement information generated for each user participating in a specific event in the facility 40 to the advertisement distribution device 400. However, even in this case, each piece of advertisement information is transmitted to the advertisement distribution device 400 in in a state associated with the user ID of the user to be provided with each piece of advertisement information.

Then, the advertisement distribution device 400 transmits the advertisement information received from the management server 300 to the user terminal 500 of the user corresponding to the user ID input in the user ID field. As a result, the advertisement information generated for each user by the advertisement information generation process in the management server 300 is distributed to the user to be provided via the advertisement distribution device 400. Then, in the user terminal 500, similarly to the user terminal 200 according to the first embodiment, advertisement display process for displaying the received advertisement information on the touch panel display of the input and output unit is performed.

According to the advertisement delivery system 2 described above, it is possible to provide advertisement information that is highly relevant to a specific event and that corresponds to the interested performer for each user, to each of a plurality of users participating in the specific event in the facility 40. In other words, it is possible to provide advertisement information that is higher concern for each user participating in a specific event to each user.

In the advertisement delivery system 2, the advertisement information generated by the advertisement information generation process in the management server 300 is distributed to each user participating in a specific event via the advertisement distribution device 400 installed in the facility 40. As a result, the advertisement information for each user can be provided to each user who is participating in a specific event in the facility 40. Therefore, according to the advertisement delivery system 2, the advertisement information for each user can be provided to each user participating in a specific event in the facility 40 at an appropriate timing, that is, at a timing at which the advertisement effect is high.

OTHER EMBODIMENTS

The above-described embodiments are merely examples, and the present disclosure can be implemented with changes made as appropriate without departing from the gist of the present disclosure. For example, the present disclosure may be applied to an advertisement delivery system for providing advertisement information to a plurality of students (users) belonging to a school for a specific examination. In this case, a space in a facility (school building) of the school shared by a plurality of students who aim to take the specific examination corresponds to a "specific space" according to the present disclosure. The "specific examination" corresponds to the "attribute of a specific space" according to the present disclosure. In addition, subjects of the exam or the like selected by each student in a specific examination may be "attributes of each user" according to the present disclosure.

The processing and units described in the present disclosure can be implemented by being freely combined unless technical conflicts arise. Moreover, the processing described as processing to be performed by a single apparatus may be performed by a plurality of apparatuses in a shared manner. Alternatively, the processing described as processing to be performed by different apparatuses may be performed by a single apparatus. In a computer system, it can be flexibly changed which hardware component (server component) is used to implement each function.

The present disclosure can also be implemented by providing a computer program designed to implement the functions described in the above embodiments to a computer, and by one or more processors included in the computer reading and executing the program. Such a computer program may be provided to the computer by using a non-transient computer-readable storage medium that can be connected to a system bus of the computer, or may be provided to the computer via a network. Examples of the non-transient computer-readable storage medium include any types of disks/discs such as magnetic disks (floppy(R) disk, hard disk drive (HDD), and the like) and optical discs (CD-ROM, DVD disc, Blu-ray Disc, and the like), read-only memory (ROM), random access memory (RAM), EPROM, EEPROM, magnetic card, flash memory, optical card, and any type of media suitable for storing therein electronic instructions.

What is claimed is:

1. An advertisement delivery system configured to provide advertisement information to each user of a plurality of users located in a same specific space shared by the plurality of users each having a specific purpose, which is inputted data by each of the plurality of users indicating a shared attribute of the plurality of users related to the specific space, the advertisement delivery system comprising:

an information processing device including a memory and a processor, the information processing device being configured to:

receive an inputted attribute from each user of the plurality of users, which is inputted to a user terminal associated with each user of the plurality of users, each attribute from each user of the plurality of users corresponding to the respective specific purpose shared by each user of the plurality of users, and individually generate advertisement information for each user of the plurality of users based on (i) an attribute of the specific space associated with the specific purpose, and (ii) the received attribute of each user of the plurality of users associated with the specific purpose shared by each user of the plurality of users; and an advertisement distribution device arranged in the specific space, which is separate from the information processing device, the advertisement distribution device including a memory, a processor, and a short-distance communication transceiver configured to wirelessly communicate with each terminal device of each user of the plurality of users located in the specific space, and the advertisement distribution device being configured to:

receive, via the short-distance communication transceiver, the inputted attribute from the terminal device of each of the plurality of users, and link the attribute of the specific space to each of the received attributes;

transmit the inputted attribute from each terminal device and the linked attribute of the specific space to the information processing device in order to generate the advertisement information;

receive the generated advertisement information for each user of the plurality of users from the information processing device; and transmit, via the short-distance communication transceiver, each of the received advertisement information to each terminal device associated with each user of the plurality of users to display the advertisement information on a display panel of the respective terminal device.

2. An information processing device adapted to be used with the advertisement delivery system as set forth in claim 1, the information processing device including a first controller configured to execute:

generating advertisement information for each user based on the attribute of the specific space associated with the specific purpose and the attribute of each user associated with the specific purpose; and transmitting the advertisement information for each user to the advertisement distribution device.

3. An advertisement distribution device adapted to be used with the advertisement delivery system as set forth in claim 1, the advertisement distribution device including a second controller configured to execute:

receiving the advertisement information for each user from the information processing device, transmitting the received advertisement information to the user terminal associated with the user to be provided.

* * * * *